(No Model.)
W. H. JOHNSON.
WOOD WORKING TOOL.
No. 445,276. Patented Jan. 27, 1891.
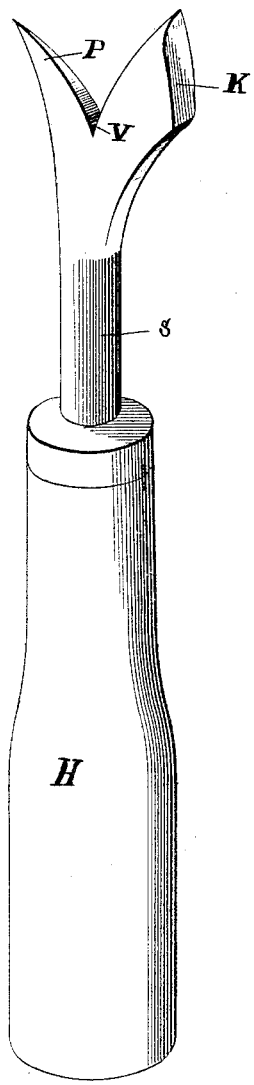
Witnesses
Isaac Behrend
N. L. Collamer
Inventor
William H. Johnson.
By his Attorneys.
C. A. Snow & Co.
THE NORRIS PETERS CO., PHOTO-LITHO., WASHINGTON, D. C.

UNITED STATES PATENT OFFICE.

WILLIAM HENRY JOHNSON, OF ARGENTINE, MICHIGAN.

WOOD-WORKING TOOL.

SPECIFICATION forming part of Letters Patent No. 445,276, dated January 27, 1891.

Application filed June 3, 1890. Serial No. 354,101. (No model.)

*To all whom it may concern:*

Be it known that I, WILLIAM HENRY JOHNSON, a citizen of the United States, residing at Argentine, in the county of Genesee and State of Michigan, have invented a new and useful Wood-Working Tool, of which the following is a specification.

This invention relates to wood-working tools, and more especially to the devices used for scratching or scoring wood.

The object of the invention is to combine with such scratcher a knife-edge adapted for other purposes.

To this end the invention consists in a tool of the specific construction hereinafter described, and as illustrated in the drawing, in which is shown a perspective elevation of the device.

H is a handle of any preferred shape or material, and S is the shank of the tool, which is of finely-tempered steel, or which may be of steel or even of iron with steel edges and points. At its outer end this shank is slightly flattened and enlarged to form a head which is branched, so as to be of approximate Y shape, and one member of this branch is extended to a point P, which curves slightly outward, as shown, while the other member is broadened to form a blade, and is provided with a knife-edge K, standing about parallel with the shank of the tool. Either one or both faces of the knife-edge may be ground, as preferred, although I have illustrated the knife with but one ground face. The outer ends of the knife and of the point extend an equal distance from an axial line continued from the center of the handle H, as shown. The head of the device may be inserted in a crack formed in a board and then twisted to split the board. Between the point P and the knife K the metallic body of the device has a V-shaped notch V, which can be passed under the head of a nail to draw the same in a manner which will be well understood.

The point P is used for scoring or scratching along a straight-edge, a ruler, or a square, and the knife-edge K can be used for whittling, cutting, or splitting, or if the device be large and possesses considerable weight this edge may be used for chopping purposes. The curving of the point outwardly from the shank S renders it much more easily used for the purposes described than if it were straight, as an ordinary scratcher or awl.

Having thus described my invention, what I claim is—

The herein-described wood-working tool, the same comprising a handle and a metallic shank seated therein, the shank being of approximate Y shape, with one of its outer ends pointed and the other widened and ground to a knife-edge standing parallel with the shank, the tips of said ends being an equal distance from the handle and forming a V-shaped notch in the outer end of the shank, all substantially as and for the purposes specified.

In testimony that I claim the foregoing as my own I have hereto affixed my signature in presence of two witnesses.

WILLIAM HENRY JOHNSON.

Witnesses:
   J. W. SHERWOOD,
   ALONZO B. HYATT.